Patented July 9, 1929.

1,720,278

UNITED STATES PATENT OFFICE.

ELMER H. KING, OF PORTLAND, MAINE.

CHEMICAL SUBSTANCE.

No Drawing.  Application filed April 19, 1920. Serial No. 374,904.

My invention relates to a new definite chemical substance or entity of paramount importance as a medicinal agent, and to the manner of compounding same.

I have discovered that by combining with a desaccharated glucoside an alkaloid suitable, with reference to each other, as to safety, and efficiency, I have produced a novel and definite chemical substance or entity having certain remarkable curative properties for various human ailments heretofore generally regarded as incurable by medicine, and chief among which are those diseases of the body cells or tissue coming under the general classification of sarcomata, carcinomata, glandular hypertrophies and chronic inflammation.

The theory upon which I have developed this new chemical entity is that an alkaloid is desirable because of specificity; that is, for my purpose, certain alkaloids possess "anchoring", or "binding", power; and a desaccharated glucoside is desirable to furnish the power, after being anchored or bound through the agency of an alkaloid, where, and when, desired, to do the work required to be done. In so far as I am aware, no attempt has hitherto been made so to combine alkaloids and desaccharated glucosides so as to produce as a product a definite salt of the desaccharated glucoside acting as an acid with the alkaloid acting as a base.

The alkaloids which I have found useful, thus far, are quinine and caffeine. These alkaloids or bases, I have used in various forms. For example, I have employed quinine, as alkaloid, as hydrochloride, and as dihydrochloride, of this alkaloid. Processes for the use of each of these three are hereinafter set forth. Among the substitutes for dihydrochloride of quinine are quinoline, cinchonine, cinchonidine, and quinidin, and their salts with hydrochloric, or sulphuric acids. The sulphate, and disulphate, are better; but quinolin and quinidin, as well, as the sulphates, are not so good.

The desaccharated glucosides which I have found useful are hematoxylin, brazilin, quercetin, and vitexin. I am investigating other desaccharated glucosides of similar chemical structure. It is to be understood that these bodies are not strictly speaking glucosides but are the residue remaining after glucose, or other sugar, has been split off from the native molecule, hence I have called them desaccharated glucosides. There is little choice among the four mentioned, except that hematoxylin is most efficient. Fisetin, and the morin of fustic, may, also be employed in place of hematoxylin.

Processes of preparation. (1)

1. Add the gram-molecular weight of the desaccharated glucoside (e. g. hematoxylin) to 10,000 mils boiling one-half normal hydrochloric acid.
2. To solution (1) add the gram-molecular weight of quinine (the alkaloid, not a salt).
3. Cool to 20 degrees centigrade and make up volume to 10,000 mils.
4. Neutralize with saturated aqueous solution of sodium bicarbonate ($NaHCO_3$).
5. Filter.
6. Sterilize.

Second process. (2)

1. Add the gram-molecular weight of the desaccharated glucoside (e. g. hematoxylin) to 10,000 mils of boiling one-half normal hydrochloric acid.
2. Add to the gram-molecular weight of quinine hydrochloride in saturated aqueous solution, a saturated aqueous solution of sodium bicarbonate, until effervescence ceases.
3. Add solution (2) to solution (1), noting solution (2) contains a precipitate which should be added along with whole solution to solution (1).
4. Cool to 20 degrees centigrade. The volume should be adjusted to 10,000 mils.
5. Neutralize with saturated aqueous solution sodium bicarbonate. Indicator is the contained desaccharated glucoside.
6. Filter.
7. Sterilize.

Third process. (3)

1. Add the gram-molecular weight of quinine dihydrochloride to ten thousand mils of boiling water.
2. To the foregoing boiling solution add the gram-molecular weight of the desaccharated glucoside (e. g. hematoxylin). Add the glucoside bit by bit, waiting between such added portions until effervescence ceases.

3. Neutralize with a saturated solution of sodium bicarbonate.

4. Filter.

5. Sterilize.

In all the three foregoing processes, the indicator for end point of neutralization is the desaccharated glucoside contained in combination in solution. The solutions resulting as end product of the processes, three in number, given above, constitute the solutions as used for treatment, that is, no further modification is used. Mixtures of different solutions, each made by the above processes, but containing various alkaloids and desaccharated glucosides may be used, and permutations of them may be employed as best suit the purpose in view.

Caffeine may be substituted in process one (1) in place of the alkaloid quinine or in place of quinine hydrochloride in process two (2). In both instances, when I have wished to I have employed this alkaloid (the salt of caffeine) in combination with a desaccharated glucoside, in place of, or together with, a quinine and the desaccharated-glucoside.

As a result of careful investigation I have arrived at the conclusion that quinine is decidedly preferable as the alkaloid to the other substitutes mentioned and that hematoxylin is superior to all other desaccharated glucosides, so called, of the group to which hematoxylin belongs, though the others mentioned give approximate results, the difference among them being more in degree than in kind. The active principle of hematoxylin, where it can be placed or anchored by the alkaloid at the seat of the trouble, has given superior results over all other desaccharated glucosides which I have employed.

With respect to caffeine, theobromine, is almost, but not quite its equal.

Slight immaterial changes could be made in a side chain of hematoxylin, either by addition, or substitution, or subtraction, without (materially) affecting its action.

As to the choice between the alkaloids quinine and caffeine, quinine is best for undifferentiated protoplasm; caffeine for differentiated. Hence quinine is best for the majority of the sarcomata; while some require both quinine and caffeine-hematoxylinate. Most of the cancers, require admixture of both, in relative portions approximately determinable by judgment of how much differentiated (epithelial) tissue, and of how much undifferentiated (fibrous) tissue. It is possible to lay down, within very close limits, what shall be used for the majority of the sarcomata (the remaining sarcomata, fairly easily recognized, belonging, so far as treatment goes, with the carcinomata), what shall be used in cancers, what in pure glandular (epithelial) hypertrophies, and what in chronic inflammations. Nor, will it be difficult to have the goods ready bottled for use.

The stability of the preparations is shown by the fact that I have kept them sealed in glass containers for six months and thereafter found them still efficient. It is important to note that efficiency is proportional to instability of the preparation. The problem is to hold a delicate substance in unstable equilibrium until the patient receives it.

My investigations have convinced me that in the preferred preparation I have produced a new definite chemical substance in solution e. g. quinine-hematoxylinate. The substance is however, so delicate that in the process of isolating the body, oxidation occurs, so that what one has when he is done is quinine-hematinate, incapable of reduction.

By the utilization of the various substitutes I produce equivalent new definite chemical substances, all possessing to a greater or less degree the curative properties of the quinine-hematoxylinate e. g.

1. Quinine-brazilinate.
2. Quinine-quercetinate.
3. Quinine-vitexinate.
4. Quinine-quercitrinate.
5. Quinine-fisetinate.
6. Caffeine-hematoxylinate.
7. Caffeine-brazilinate.
8. Caffeine-quercetinate.
9. Caffeine-vitexinate.
10. Caffeine-quercitrinate.
11. Caffeine-fisetinate.

Having thus disclosed the manner of compounding the new chemical substances and stated the more important field in which their curative properties have been demonstrated, I may in conclusion add, without intending thereby in any manner to limit myself, that the solution as used to the present time has given the best results when administered hyperdermatically, and I have demonstrated that it will attack and destroy the microorganism which I have isolated as the cancer germ. The experiments by which I have demonstrated the isolation of this germ are described at length in the issue of March 13th, 1920, of the Medical Record.

I desire it to be understood that I seek in this application to protect and broadly cover both the new chemical product in its various forms as hereinbefore set forth and also the manner of compounding the same.

My copending application Serial No. 533,671, filed February 2, 1922, is a continuation in part hereof.

Having thus described my invention, what I claim as new and desire to secure by Letters Patent, is:—

1. As an article of manufacture, a composition of matter consisting of a solution of a hematoxylin with the alkaloid quinine.

2. The hereindescribed new medicinal agent comprising a solution in unstable equilibrium of an alkaloid of the quinine group, and a desaccharated glucoside of the hematoxylin group.

3. The hereindescribed process for the preparation of a new medicinal agent as follows: Add the gram-molecular weight of quinine hydrochloride to 10,000 mils of boiling water, add to said solution gram-molecular weight of hematoxylin, and neutralize with a saturated solution of sodium bicarbonate.

In testimony whereof I, ELMER H. KING, affix my signature.

ELMER H. KING.